June 26, 1934.　　　　G. W. FERREL　　　　1,964,458
REAMER
Filed July 17, 1933
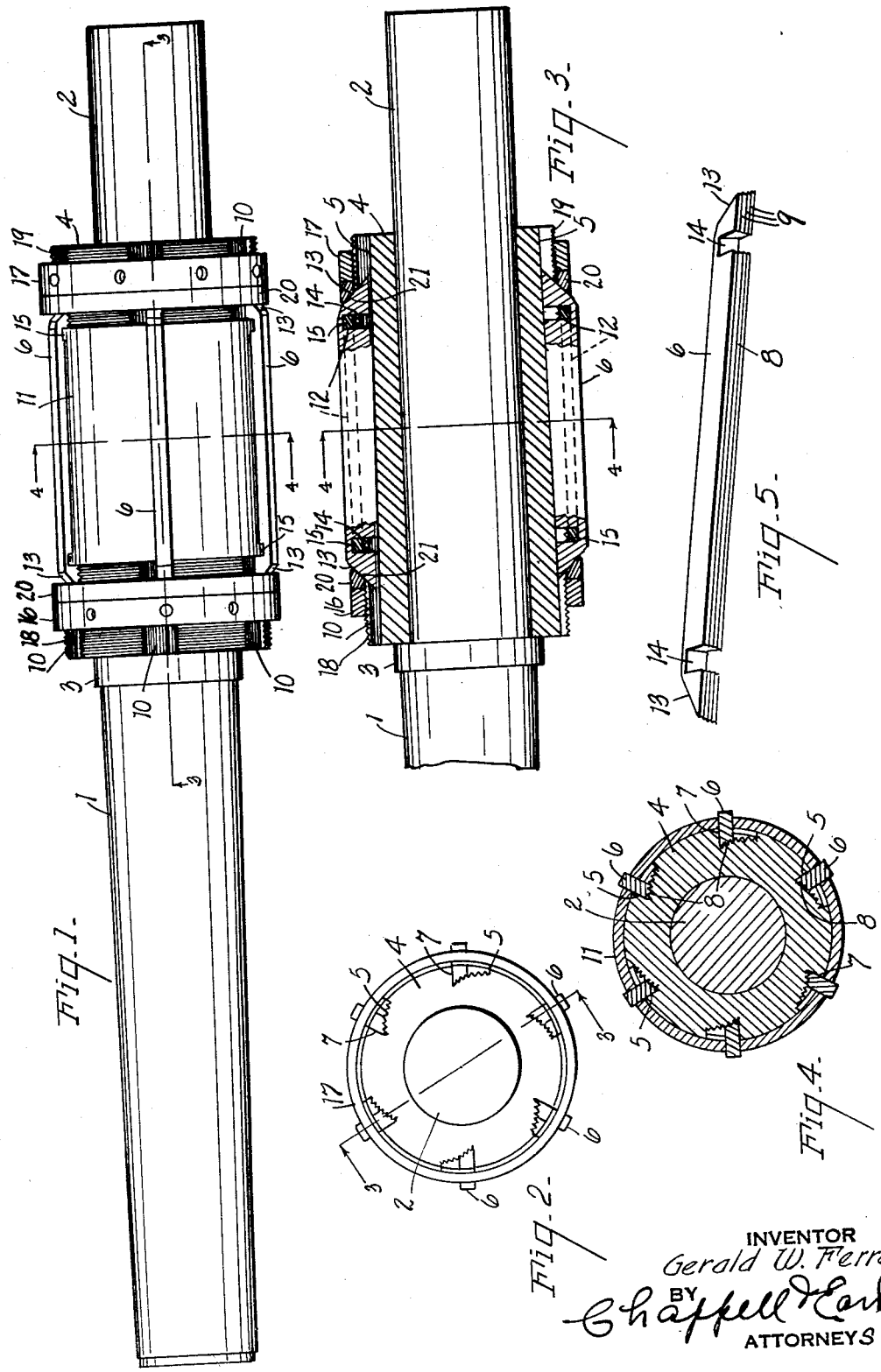

Patented June 26, 1934

1,964,458

UNITED STATES PATENT OFFICE 1,964,458

REAMER

Gerald W. Ferrel, Mattawan, Mich.

Application July 17, 1933, Serial No. 680,720

15 Claims. (Cl. 77—75)

This is a continuation in part of my application, Serial No. 578,431, filed December 2, 1931, for Reamer.

The main objects of my invention are:

First, to provide an improved adjustable reamer having means associated therewith for accurately and simultaneously positioning the several cutting blades thereof.

Second, to provide an improved adjustable reamer in which the blades are effectively supported throughout a wide range of adjustment.

Third, to provide a reamer having a wide range of adjustment.

Fourth, to provide a reamer of this type having means for first roughly adjusting the position of the cutting blades by rotating the blades relative to the axis of the spindle, and, second, means for obtaining a fine or precision adjustment by changing the position of the blades longitudinally of the spindle.

Fifth, to provide an adjustable reamer that is relatively simple in construction, economical to manufacture, and extremely easy and accurate in adjustment.

Objects relating to details and economies of my invention will definitely appear from the description to follow. The invention is defined and pointed out in the claims.

A structure which is a preferred embodiment of my invention is illustrated in the accompanying drawing, in which:

Fig. 1 is a view in side elevation of an adjustable reamer embodying the features of my invention.

Fig. 2 is an end elevation.

Fig. 3 is a view partially in longitudinal section on line 3—3 of Figs. 1 and 2.

Fig. 4 is a transverse section on line 4—4 of Figs. 1 and 3.

Fig. 5 is an inserted perspective view of a cutting blade.

Referring to the drawing, 1 indicates a spindle or shank having an end portion 2 of reduced diameter which is slightly tapered from the shoulder 3. Sleeved on the portion 2 with a tight friction fit is a head 4 having a plurality of longitudinal grooves 5 which constitute seats for the cutting blades 6. The grooves or seats 5 are convex or cam-like and have inner flat sides 7. The cam-like blade seat as best illustrated by Figs. 2 and 4 is eccentric relative to the axis of the head so that when the cutting blades are rotatably adjusted relative thereto, they are moved outwardly or inwardly. The seats are inclined or tapered longitudinally.

The coacting seats 8 at the bottom of the cutting blades are provided with longitudinal teeth or ribs 9 for coaction with the longitudinal teeth or ribs 10 of the blade seats 5. These longitudinal teeth or ribs coact to hold the blades in their adjusted circumferential positions. The seats and blades are similarly conformed transversely and longitudinally to insure the parallel relation of the cutting edges of the blades regardless of their radial adjustment.

The head is provided with a shell or sleeve 11 rotatable thereon and having slots 12 therein for the blades 6 supporting them in spaced relation and for radial adjustment on the head. The ends of the blades are beveled at 13 and are provided with notches or recesses 14 receiving the connecting portions 15 of the sleeve at the ends of the slots. The blades are adjusted longitudinally of the head and held in an adjusted position by collars or nuts 16 and 17 threaded to the inner and outer ends 18 and 19, respectively, of the head. Clamping rings 20 are disposed at the inside of collars and are provided with beveled inner ends 21 coacting with the beveled ends 13 of the blades.

The cutting blades are very accurately adjusted in the following manner: The clamping collars are first loosened sufficiently so that the sleeves and cutting blades may be rotated on the head for a rough adjustment of the cutting diameter of the tool. The cutting diameter is then given a fine or precision adjustment by changing the longitudinal position of the sleeve and the blades by means of the threaded collars. This adjustment is extremely accurate inasmuch as the grooves are tapered only slightly between their inner and outer ends. After the precision adjustment has been made, the collar nuts are tightened to lock the blades securely in place.

A reamer constructed in accordance with my invention has a wide range of adjustment and may be used in place of a plurality of reamers of the type used in the past, that is, my reamer is in fact equivalent to a plurality of reamers. This results in a great saving to the buyer inasmuch as he needs to purchase only one reamer instead of several.

It will be apparent to those skilled in the art that with the above arrangement of parts I provide an adjustable reamer that may be very accurately adjusted. Furthermore, the adjustment may be made relatively quickly, considering its nicety. A further advantage is that the reamer has a wide range of adjustment, the blades being effectively supported throughout their length in all adjusted positions.

It is obvious that various changes and modifications may be made in the details of construction and design of the above specifically described embodiments of my invention without departing from the spirit thereof, such changes and modifications being restricted only by the scope of the following claims.

Having thus described my invention, what I claim as new and desire to secure by Letters Patent is:

1. In an adjustable reamer, the combination with a spindle, a head on said spindle and provided with a plurality of longitudinal eccentrically curved blade seats, said seats being longitudinally inclined, cutting blades conformed to fit said seats, said blades and seats having coacting longitudinal teeth or ribs for holding them in adjusted circumferential position, means for supporting said blades for radial adjustment, and means for clamping said blades in their adjusted positions relative to said seats.

2. In an adjustable reamer, the combination with a head provided with a plurality of cam-like longitudinally inclined blade seats having longitudinal teeth or ribs, of a sleeve mounted on said head for rotative adjustment and having a slot adjacent each groove, a cutting blade in each slot for coaction with a groove and having longitudinal teeth or ribs meshing with the teeth or ribs in the groove, and collars threaded to the ends of said head for adjusting said blades longitudinally of said head and for clamping said blades in adjusted position.

3. In an adjustable reamer, the combination with a head provided with a plurality of longitudinally inclined and circumferentially eccentric cam-like blade seats having longitudinal teeth or ribs, of a sleeve embracing said head and having a longitudinal slot adjacent each seat, a blade in each slot for coaction with a seat and having longitudinal teeth or ribs meshing with the teeth or ribs in the seat, collars threaded to the ends of said head for adjusting and clamping the blades in place, and rings at the inner ends of said collars and having conical surfaces at their inner ends engaging the beveled ends of said blades.

4. In an adjustable reamer, the combination with a head provided with a plurality of longitudinally inclined eccentric cam-like blade seats, of a sleeve embracing said head and having a longitudinal slot adjacent each seat, a blade radially adjustable in each slot for coaction with a seat, the blades and seats having coacting spline-like means for holding them in adjusted circumferential position, and means including collars threaded to the ends of said head for longitudinally adjusting and clamping said blades in place.

5. In an adjustable reamer, the combination with a head having curved, longitudinally inclined eccentrically curved blade seats thereon, of blades coacting with said seats and having similarly shaped and inclined seats, means for adjusting said blades longitudinally and circumferentially of said spindle whereby to accurately change the cutting diameter of said blades, longitudinal ribs or splines for holding the blades in circumferential adjustment, and means for locking said blades in adjusted position.

6. In an adjustable reamer, the combination with a head having curved, longitudinally inclined eccentrically disposed blade seats, of blades coacting with said seats and having similarly shaped and inclined seats, said blades and seats having coacting longitudinal teeth or ribs for holding them in adjusted circumferential position, and means for adjusting said blades longitudinally and circumferentially of said spindle whereby to accurately change the cutting diameter of said blades.

7. In an adjustable reamer, the combination with a head provided with a plurality of eccentrically curved blade seats and inclined longitudinally of the head, blades conformed on their inner edges to said seats and rotatively adjustable about the axis of the head thereon, said blades and seats having coacting longitudinal teeth or ribs for holding them in adjusted circumferential position, a shell on said head and longitudinally slotted to receive said blades, and blade adjusting and clamping members threaded upon said head to coact with the ends of said blades whereby they may be longitudinally adjusted on said seats, said seats being converged toward the outer end of the head.

8. In an adjustable reamer, the combination with a head provided with a plurality of curved eccentrically disposed blade seats disposed longitudinally of the head, blades conformed on their inner edges to said seats and rotatively adjustable about the axis of the head thereon, said blades and seats having coacting longitudinal teeth or ribs for holding them in adjusted circumferential position, and blade adjusting and clamping means on said head to coact with the ends of said blades whereby they may be longitudinally adjusted on said seats, said seats being converged toward the outer end of the head.

9. In an adjustable reamer, the combination with a head provided with a plurality of curved eccentrically disposed blade seats inclined longitudinally of the head, blades conformed on their inner edges to said seats and rotatively adjustable about the axis of the head thereon, said blades and seats having coacting groove and tongue means for holding them in adjusted circumferential position, a shell on said head and longitudinally slotted to receive said blades, and blade clamping members on said head coacting with the ends of said blades whereby they may be longitudinally adjusted on said seats.

10. In an adjustable reamer, the combination with a head provided with a plurality of cammed blade seats, blades supported on said seats and rotatively adjustable about the axis of the head thereon said blades and seats having coacting means for holding them in adjusted circumferential position, a shell on said head and longitudinally slotted to receive said blades, and blade adjusting and clamping members threaded upon said head to coact with the ends of said blades whereby they may be longitudinally adjusted on said seats, said seats being converged toward the outer end of the head.

11. In an adjustable reamer, the combination with a head provided with a plurality of cammed blade seats, blades supported on said seats and rotatively adjustable about the axis of the head, longitudinal ribs or splines for holding the blades in circumferential adjustment, a shell on said head and longitudinally slotted to receive said blades, and blade adjusting and clamping members threaded upon said head to coact with the ends of said blades whereby they may be longitudinally adjusted on said seats, said seats being converged toward the outer end of the head.

12. In an adjustable reamer, the combination with a head provided with a plurality of cammed blade seats, blades supported on said seats and rotatively adjustable about the axis of the head thereon, said blades and seats having coacting spline-like means for holding them in adjusted circumferential position, blade adjusting and clamping members threaded upon said head to coact with the ends of said blades whereby they may be longitudinally adjusted on said seats, said seats being converged toward the outer end of the head.

13. In an adjustable reamer, the combination with a head provided with a plurality of cammed blade seats, blades supported on said seats and rotatively adjustable about the axis of the head thereon, longitudinal ribs or splines for holding the blades in circumferential adjustment, blade adjusting and clamping members threaded upon said head to coact with the ends of said blades whereby they may be longitudinally adjusted on said seats, said seats being converged toward the outer end of the head.

14. In an adjustable reamer, the combination with a head provided with a plurality of circumferentially cammed and longitudinally inclined blade seats, blades supported on said seats and rotatively adjustable about the axis of the head thereon, said blades and seats having coacting longitudinal teeth or ribs for holding them in adjusted circumferential position, a shell on said head and longitudinally slotted to receive said blades, and blade clamping members threaded upon said head to coact with the ends of said blades whereby they may be longitudinally adjusted on said seats.

15. In an adjustable reamer, the combination with a head provided with a plurality of circumferentially cammed and longitudinally inclined blade seats, blades supported on said seats and rotatively adjustable about the axis of the head thereon, longitudinal ribs or splines for holding the blades in circumferential adjustment, a shell on said head and longitudinally slotted to receive said blades, and blade clamping members threaded upon said head to coact with the ends of said blades whereby they may be longitudinally adjusted on said seats.

GERALD W. FERREL.